United States Patent [19]

Dugle

[11] Patent Number: 4,678,051
[45] Date of Patent: Jul. 7, 1987

[54] RECTILINEARLY TRAVELING VEHICLE

[76] Inventor: Thomas E. Dugle, 5000 Miami Rd., Cincinnati, Ohio 45243

[21] Appl. No.: 854,794

[22] Filed: Apr. 23, 1986

[51] Int. Cl.[4] .................... B62D 11/00; B62D 57/00
[52] U.S. Cl. ........................................ 180/9.1; 104/50
[58] Field of Search ................. 180/9.1, 9.3, 9.2, 9.26, 180/9.22, 9.42; 104/50, 166; 301/5 P; 305/15, 60

[56] References Cited

U.S. PATENT DOCUMENTS 3,439,425  4/1969  Doxey et al. .................... 180/9.1
4,223,753  9/1980  Bradbury ........................ 180/9.1

Primary Examiner—John J. Love
Assistant Examiner—Donn McGiehan
Attorney, Agent, or Firm—Charles E. Cates

[57] ABSTRACT

A vehicle or cart for movement in mutually perpendicular directions includes two sets of driving chains both in contact with the floor at the same time, one set for driving in one direction includes rollers whose axes are parallel to the direction of movement and thus provide gripping with the floor when moving in that direction and the corresponding rollers on the oppositely directed chain links have their axes perpendicular to the direction of movement and thus roll along the floor without impeding, significantly, the movement of the vehicle in the first direction. When the vehicle or cart moves in the second direction the rollers on the second set of chain links engage the floor while the rollers of the chains in the first links roll without impeding the movement.

5 Claims, 12 Drawing Figures

RECTILINEARLY TRAVELING VEHICLE

BACKGROUND OF THE INVENTION

Vehicles, carts, or the like used for carrying goods of any kind frequently have to be able to move in mutually perpendicular directions, at different times, of course. For example, in a warehouse where there are large numbers of packaged goods arranged in rows and columns with aisles, or the like, provided between the rows, a vehicle or cart carrying goods to be disposed in various stacks may have to move in one direction for a certain distance and then move in a direction at right angles for a further period of time followed by movement in the first direction again. Obviously, such a vehicle or cart has to be able to move forward as well as backward in either of the mutually perpendicular directions.

Ordinary vehicles or carts having wheels arranged in the usual fashion can, of course, negotiate turns at right angles, but a larger aisle or space must be provided for this purpose because the cart has to have room within which to turn. This is true whether or not the vehicle or cart is provided with caster type wheels or just ordinary wheels that may turn, or not, for that matter.

SUMMARY OF THE INVENTION

This invention relates to vehicles or carts which are enabled to move in mutually perpendicular directions such as east-west and north-south and it is the object of the invention to provide improved vehicles or carts of this nature.

It is a further object of the invention to provide an improved vehicle or cart of the nature and character indicated that is simple in form, efficient in operation and easy to manufacture.

Further objects and advantages of the invention will become apparent from a reading of the description and an understanding of the accompanying drawings and claims.

It is a principle of the invention that the treads for moving the inventive vehicle in one direction include chain connected rollers, or the like, which serve as grippers, for example, for moving the vehicle in that direction and as rollers when the vehicle is moving in the right angular direction. Similarly, for the right angular direction there is provided a series of rollers which are chain connected so as to grip the floor and drive the vehicle in the right angular direction which rollers roll when the vehicle is moving in the initial direction.

In carrying out the invention according to one form there is provided a vehicle, or the like, capable of moving in mutually perpendicular directions comprising, a supporting framework, a first pair of continuous link moving elements supported by the framework and oriented in one direction, a second pair of continuous link moving elements supported by the framework and oriented in a second direction perpendicular to the one direction, the links in the first pair of moving elements comprising first roller means whose axes are parallel to the one direction, and the links in the second pair of moving elements comprising second roller means whose axes are parallel to the second direction.

In carrying out the invention according to a second form the first roller means comprise a series of individual rollers and the second roller means comprise a series of individual rollers.

BRIEF DESCRIPTION OF THE DRAWING

For a better understanding of the invention, reference should now be had to the accompanying drawings in which:

FIG. 10 is a fragmentary, exploded, perspective view illustrating the interfitting of certain components.

DESCRIPTION OF THE PREFERRED EMBODIMENT

Figure 1:
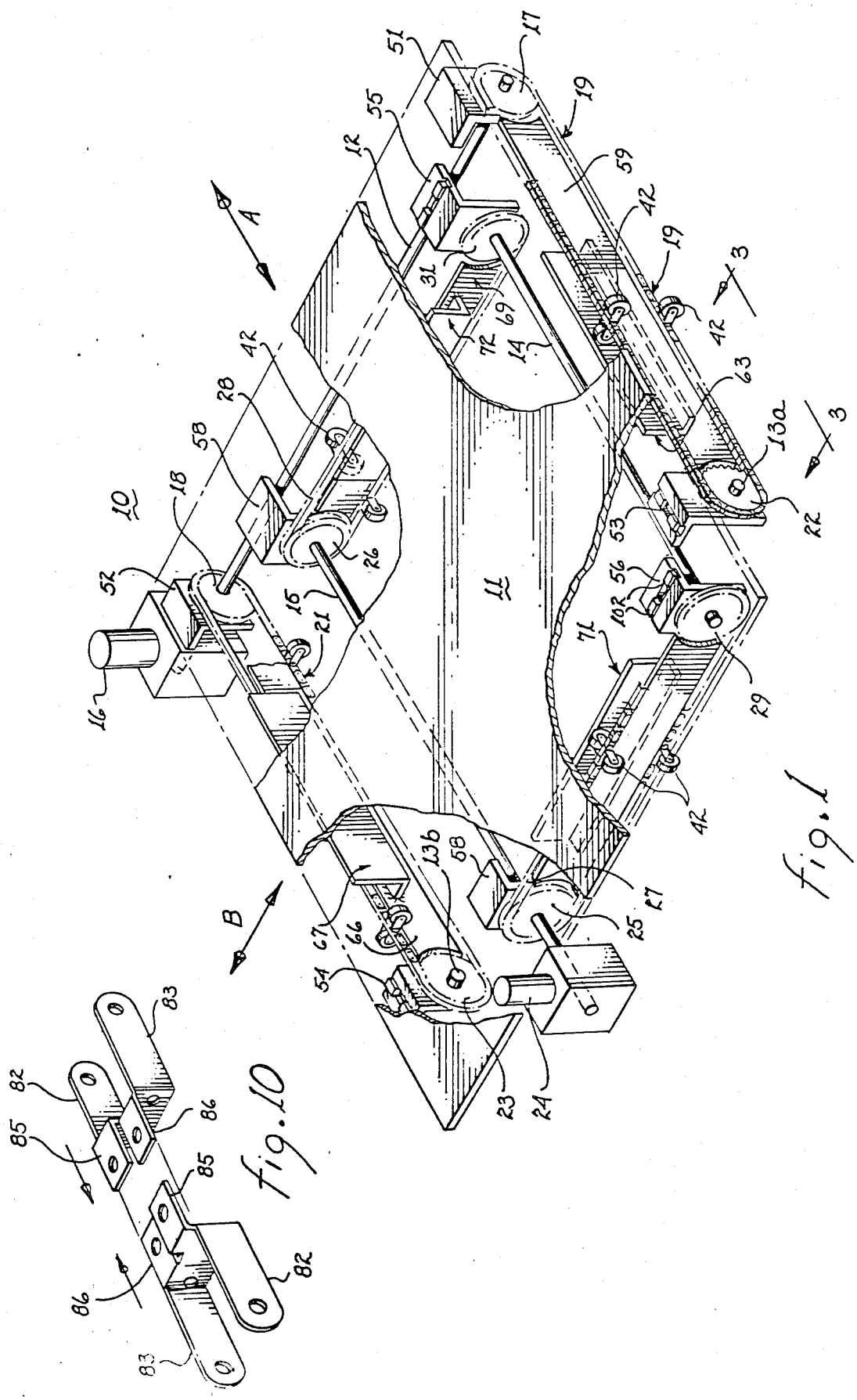
FIG. 1 is a perspective view of a vehicle or cart according to the invention.

Referring to the drawings, the invention is shown in a vehicle or right angular cart 10 capable of moving in mutually perpendicular directions as shown by the arrows A and B, as desired. The vehicle 10 comprises a relatively rigid frame 11 supporting an axle 12 and a pair of stub axles 13a and 13b for supporting and driving the vehicle in the direction of arrow A and a pair of axles 14 and 15 for driving the vehicle in the direction of arrow B. The axle 12 is gear driven or the like from a motor 16, and by means of sprockets 17 and 18 mounted on the axle 12 the link chains 19 and 21 are driven in whichever direction desired (A or reverse). At the other ends of the link chains 19 and 21, respectively, a pair of sprockets 22 and 23 on the stub shafts or axles 13a and 13b, complete the drive for the direction A. Similarly a motor 24 is mounted on the frame 11 and is adapted through high ratio worm gearing (not shown) to drive the axle 15 and through sprockets 25 and 26 mounted on shaft 15 is adapted to drive the link chains 27 and 28. The latter are received, respectively, over the sprockets 29 and 31 mounted on axle 14 for completing the drive mechanism for the direction B (or reverse).

The frame 11 may, for example, be a relatively rigid plate to which the axles may be attached by means of brackets as will be described.

The drive motors 16 and 24 are, of course, electrically interconnected in any well-known manner so that apparatus does not normally drive itself in both directions A and B at the same time. This is to say, when one motor 16, for example, is energized the other motor 24 is not and vice-versa. There is no need for a clutch. Any means for switching the power on to one motor and off the other motor causes each energized track to operate as a drive track and causes the deenergized track elements to function as a passive roller means. In the deenergized tracks, the combination of turning resistance to the chain's moving on its support member in the drive direction (as distinguished from the passive roller direction) and the resistance of the worm gear to movement immobilizes the drive function.

Figure 2:
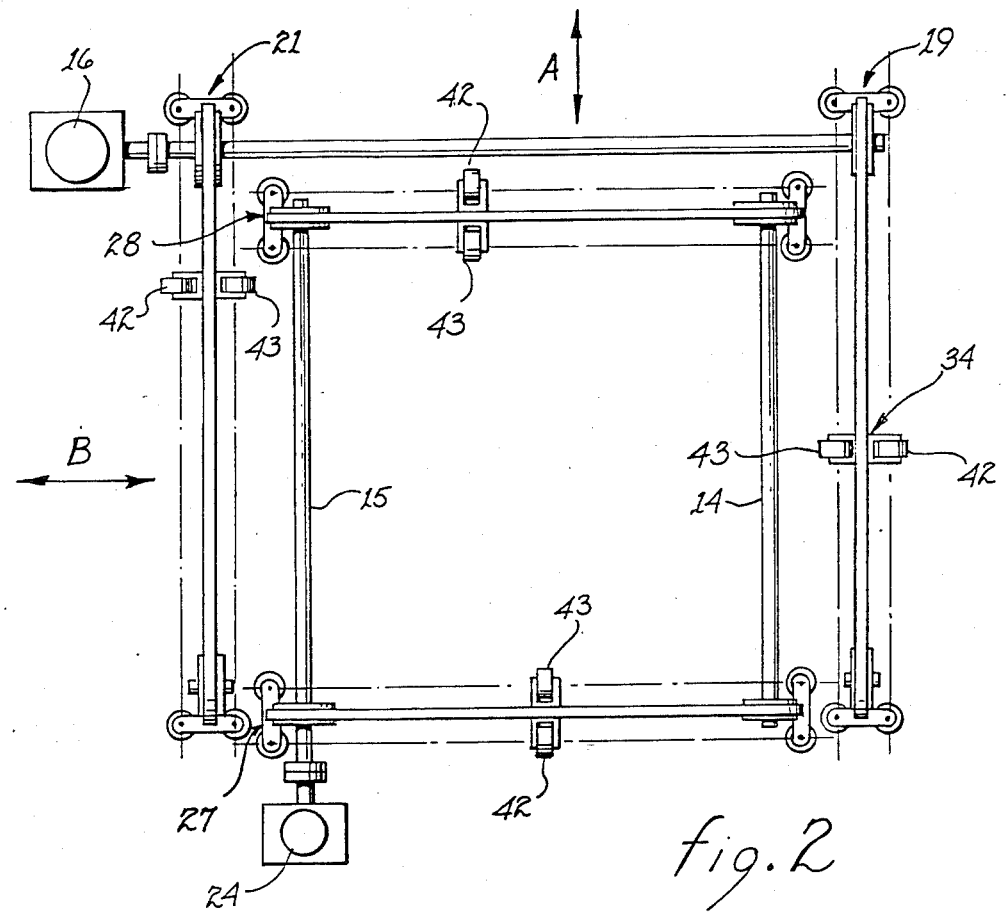
FIG. 2 is a somewhat diagrammatic view, in plan, of the apparatus shown in FIG. 1.
Figure 3:
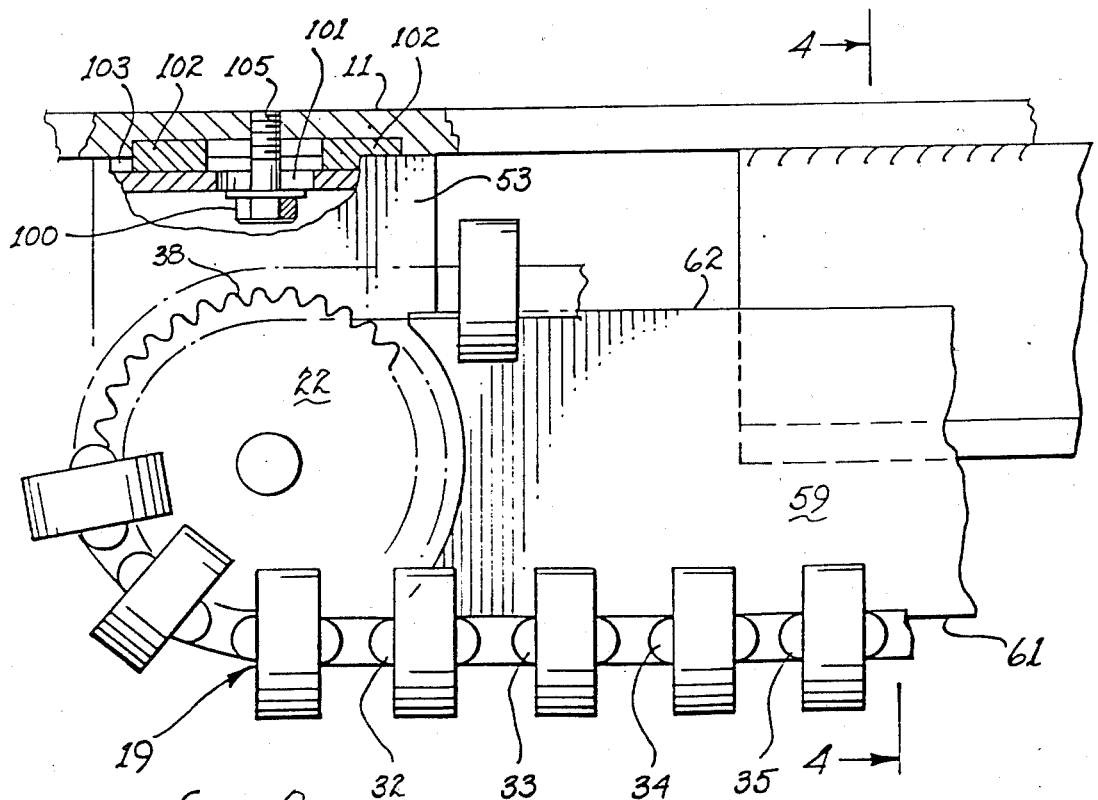
FIG. 3 is a fragmentary elevational view on a larger scale of a portion of the operating apparatus of the invention.

In FIG. 2, which is a skeletal top view, the link chains 19 and 21 for driving the vehicle or cart in the direction of arrow A may be visualized as also may the link chains 27 and 28 for driving the vehicle in the direction of arrow B, it being understood that in the context used in this application the direction of the arrows A and B would include the reverse direction.

The link chains 19, 21 and 27, 28 are essentially of the same construction as may be visualized more particularly in FIGS. 3–6. Thus only one of these link chains and a particular link will be described specifically, it being understood that one description applies to all.

Taking for example, the link chain 19 and considering FIGS. 3–6, it will be observed that the link chain consists of a series of links 32, 33, 34, 35, 36, 37, etc. These links are adapted to pass over the teeth etc. 38 of the sprocket 22 as is well understood. Considering specifically link 34, fastened to each side thereof are U-shaped supports or clevises 39 and 41 each of which supports, on suitable shafts, rollers 42 and 43, respectively. Similarly, alternate links carry U-shaped supports or clevises formed by joining opposite sides. Attached to each of the clevises by ordinary shafts as described, but not shown, are rotating rollers. The clevises and rollers are applied to all of the chain links.

Now, referring again to FIG. 2, it will be evident that the rollers 42 and 43 on the link 34 of link chain 19 and the corresponding rollers on the chain link 21 will drive a vehicle in the A direction. In this case both of the rollers 42 and 43, and similarly oriented rollers, will bear on the ground and will drive the vehicle in the sense of a caterpillar tread link drive. Similarly, when the motor 24 is energized the link chains 27 and 28 will be driven by their respective sprockets and the rollers thereof corresponding to 42 and 43 etc. will be engaging the floor and will drive the vehicle in the B direction by means of the caterpillar tread like drive.

Figure 4:
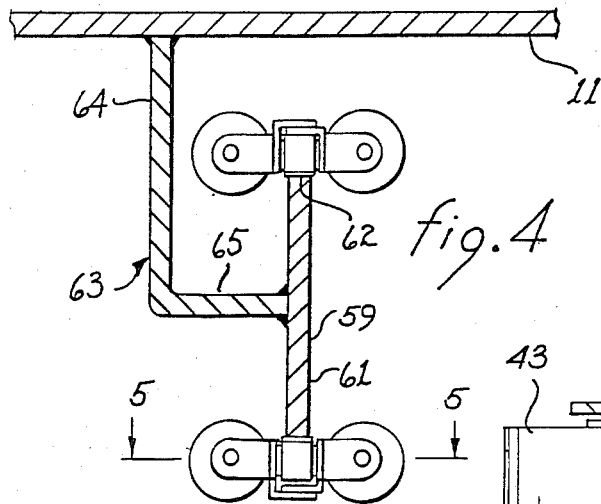
FIG. 4 is a fragmentary view taken substantially in the direction of arrows 4—4 of FIG. 3.
Figure 5:
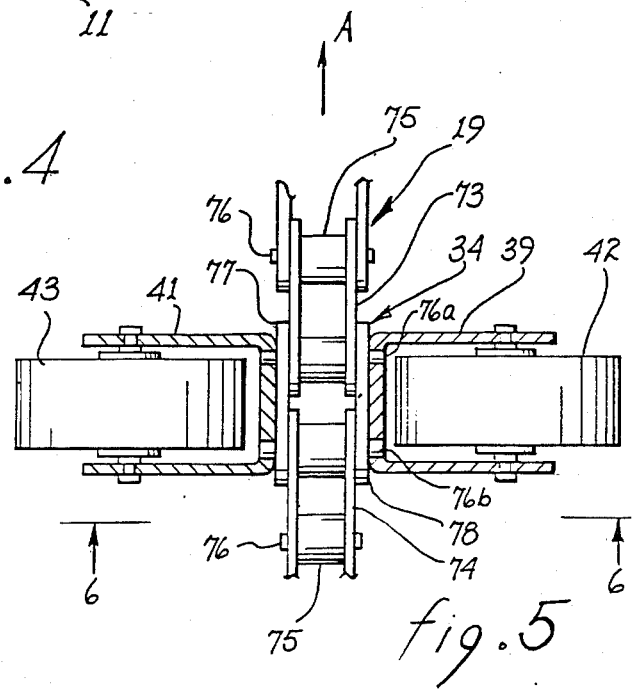
FIG. 5 is a fragmentary view on a larger scale taken substantially in the direction of arrows 5—5 of FIG. 4.
Figure 6:
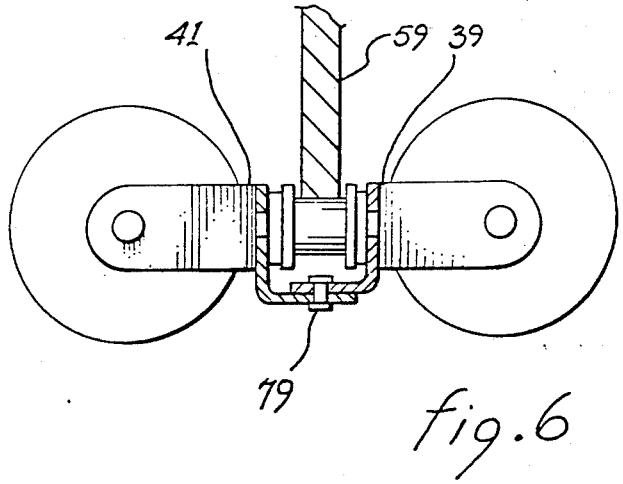
FIG. 6 is a right angular view of the components shown in FIG. 5.
Figure 8:
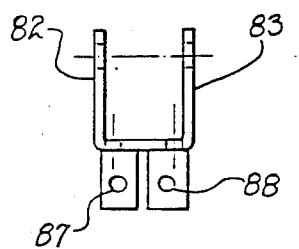
Figure 9A:
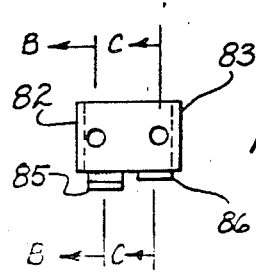
Figures 9B, 9C:
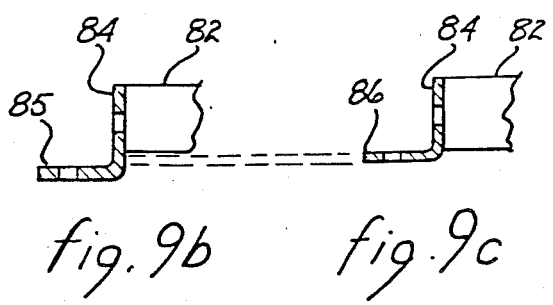

Referring to FIGS. 4–6, it will be observed that the axes of the rollers 42 and 43 are parallel to the direction of the arrow A. Thus when the link chain 19 is moving in the direction of arrow A the rollers 42 and 43 and similarly oriented rollers do not rotate, but actually grip the floor and cause the vehicle to move. However, bearing this explanation in mind and observing FIG. 2 again, it will be observed that the axes of the rollers of chain links 27 and 28 while being parallel to the direction of arrow B, are at right angles to the direction of the axes of the rollers 42 and 43, etc. Thus when the vehicle is moving in the direction of the arrow A by virtue of the rollers 42 and 43, etc. gripping the floor, the rollers of the link chains 27 and 28 are in contact with the floor but are rotating by virtue thereof because their axes are at right angles to the direction of movement A. Similarly when the vehicle is being moved in the direction of arrow B, the rollers corresponding to 42, 43, 47 and 48 etc. of the link chains 27 and 28 are gripping the floor for causing the transporting because the axes of the rollers on these links are parallel to the direction of movement B. But the axes of the rollers of link chains 19 and 21 are at right angles to those of the chain link 27 and 28 and thus the rollers of the link chains 19 and 20 while in contact with the floor are rolling thereon rather than gripping.

Thus it may be understood that when the vehicle is being driven in the direction of arrow A, the rollers on one set of link chains grip the floor while the rollers on the other set of link chains roll, and when the vehicle is being driven in the direction of the arrow B the rollers on the other set of link chains are gripping the floor while the rollers on the one set of link chains are rolling. Hence the vehicle may travel in either direction, at right angles to each other, without there being any interference or resistance to that movement.

While the driving link chains 19 and 21 for direction A and link chains 27 and 28 for direction B are shown as comprising dual rollers it will be understood that modifications of these members may be utilized. For example, there may be single rollers (corresponding to the rollers 42 and 43) carried between and by two parallel chains.

The arrangement of the link chains 19, 21, 27 and 28 may be disposed as shown in FIGS. 1 and 2 for carrying out the invention, and may be attached to the framework plate 11 by brackets, as shown, which may be welded to the plate itself. As shown in FIG. 1 the plate 11 may cover the whole supporting area of the operating mechanism, although in this figure only portions of the plate 11 are shown. The remaining portions are shown broken out to illustrate the mechanism underneath.

The brackets 51 and 52 support the shaft 12, the brackets 53 and 54 support the stub shafts 13a and 13b, the brackets 55 and 56 support the shaft 14 and the brackets 57 and 58 support the shaft 15, all in the locations indicated in FIG. 1. As already indicated the brackets, while providing suitable bearings for the supported shafts, may be welded to the underside of the plate 11 for completing the structure, but preferably are bolted thereto by means of a bolt 100 through an elongate slot 101 to engage a tapped bore 105 to provide adjustability for chain tensioning, keys 102 and key ways 103 are provided to stabilize the brackets 53, 54, 55 and 56.

When those rollers that engage the floor are engaging the floor it will be apparent that support is needed for the link chains in order to maintain contact of the rollers with the floor, particularly in the driving direction. For this purpose supporting or guide plates are provided, for example, the guide plate 59 illustrated in connection with the link chain 19 of FIG. 1. The guide plate 59 is disposed as may be seen more clearly in FIG. 3 so that the rollers of the link chain 19 (33–37) bear against the bottom edge 61 of the guide plate 59 as may be seen in this figure. In this manner the rollers of the link chain 19 are supported at the floor level between the sprocket wheels 17 and 22. The guide plate 59 includes an upper edge 62 for supporting the return run of the rollers in link chain 19.

The guide plate 59 is supported by or attached to the frame 11 by an elongated angle bracket 63 having a vertical flange 64 welded to the undersurface of the frame 11 and a horizontal flange 65 welded to the guide plate 59, all as may be seen clearly in FIG. 4.

The link chain 21 is supported in a manner similar to that described for link chain 19 by means of a guide plate 66 and an angle bracket 67. Similarly, the link chains 27 and 28 are supported by guide plates 68 and 69, respectively, and angle brackets 71 and 72, respectively.

Referring to FIGS. 5–10, one form of structure illustrating the link chain 19 and structure for attaching the rollers 42 and 43 to the link 34 may be understood. For example, the link chain 19 may comprise a series of links 73 and 74 including rollers 75 and shafts 76. The links 73 and 74 are held together by straps 77 and 78 and shafts 76a and 77b forming part of link 34 to which the clevises 39 and 41 are attached and, in turn, receive the rollers 42 and 43, respectively.

The clevises 39 and 41 are in effect identical to each other but are merely disposed one hundred and eighty degrees apart for receiving separate rollers. Thus the clevise 39 may be considered as typical and is described more specifically in connection with FIGS. 7-10. Two clevises 39 and 41, for example, are connected together by rivets 79, for example, as may be seen best in FIG. 6, in order to form a single unit for supporting the rollers 41 and 42.

Figure 7:
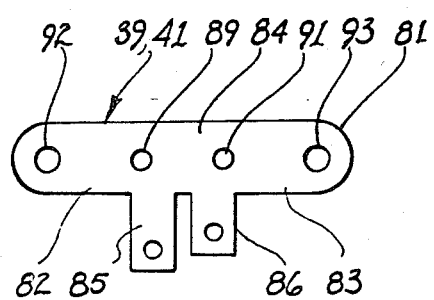
FIGS. 7, 8 and 9a–9c are various views of one of the components of the chain and roller link shown in the preceding figures.

Each of the clevises 39 and 41 is formed from a blank 81 as shown in FIG. 7. The blank 81 includes two arms 82 and 83 separated by a center part 84 and two fingers 85 and 86 extending laterally from the center part 84. The arms 82 and 83 are bent at right angles to the center part 84 to form the U-shaped clevise as may be visualized in the figures including FIG. 8. The finger 85 is longer than the finger 86 by the thickness of the material of the blank 81 and these fingers are also bent at right angles to the center part 84. The finger 86 is bent immediately at the edge of the blank 81 and the finger 85 is bent at right angles but one thickness of material away from the edge of the blank 81. This may be visualized in FIG. 9a where the finger 85 is seen disposed one thickness of material away from the center portion 84.

After the arms 82 and 83 and fingers 85 and 86 have been bent as indicated two blanks are interfitted with each other as may be visualized in FIGS. 6 and 10 and the rivets 79 applied through holes 87 and 88 formed, respectively, in the finger 85 and 86. The rivets 79 hold the assembled clevises 39 and 41 together and bring the holes 89 and 91 together into position for receiving the axes 76a and 76b which through straps 77 and 78 hold the links 73 and 74 together. The holes 92 and 93 at the ends of the arms 82 and 83 respectively are disposed to receive the axes or shafts of the rollers 42 and 43.

The described construction of the clevises 39 and 41 and as illustrated in the drawings including the exploded perspective view FIG. 10 comprise a strong and easily manufactured unit for holding the rollers together in a unitary construction.

It will be understood that while one form of the invention has been disclosed there may be many other forms which will embody the same principles and manner of operation and hence be within the scope of the subject disclosure.

I claim:

1. A vehicle, or the like, capable of moving in mutually perpendicular directions comprising, a supporting framework, a first pair of continuous link moving elements supported by said framework and oriented in one direction, said support by said framework of said first pair of continuous link moving elements including a first pair of plate means attached to said framework and each one extending substantially the full length of the respective one of said first pair of continuous link moving elements and each one having a lower guiding edge for supporting same continuously along substantially along said full length, a second pair of continuous link moving elements supported by said framework and oriented in a second direction perpendicular to said one direction, said support by said framework of said second pair of continuous link moving elements including a second pair of plate means attached to said framework and each one extending substantially the full length of the respective one of said second pair of continuous link moving elements and each one having a lower guiding edge for supporting same continuously along substantially said full length, the links in said first pair of moving elements comprising first roller means whose axes are parallel to said one direction, and the links in said second pair of moving elements comprising second roller means whose axes are parallel to said second direction.

2. The vehicle according to claim 1 wherein said first roller means comprises a series of individual rollers and said second roller means comprises a series of individual rollers.

3. The vehicle according to claim 2 wherein said individual rollers comprises a roller for each of said links.

4. The vehicle according to claim 2 wherein said first and second roller means comprises a dual roller for each of said links.

5. The vehicle according to claim 1 including motor drive means for separately driving said first and said second pairs of continuous link moving elements.

* * * * *